United States Patent Office 2,819,321
Patented Jan. 7, 1958

2,819,321

DICHLOROBENZENE MANUFACTURE

Blaine O. Pray, Wadsworth, Ohio, assignor to Columbia-Southern Chemical Corporation, County of Allegheny, Pa., a corporation of Delaware No Drawing. Application May 23, 1955
Serial No. 510,521

4 Claims. (Cl. 260—650)

The instant invention pertains to the manufacture of meta-dichlorobenzene and more particularly has relation to the conversion of other dichlorobenzene isomers to meta dichlorobenzene.

Dichlorobenzenes are prepared by substitution chlorination of benzene. This provides an isomeric dichlorobenzene mixture predominating in the ortho- and para-dichlorobenzene isomers. Only inconsequential qauntities of meta-dichlorobenzene are found in this substitution chlorination product.

Meta-dichlorobenzene has particular uses which are distinctive. Thus, meta-dichlorobenzene may be hydrolyzed to meta-chlorophenol and further hydrolyzed to resorcinol. Both these compounds find utility in the manufacture of synthetic resins.

U. S. Letters Patent 2,666,085 details a process in which dichlorobenzene may be isomerized to meta-dichlorobenzene. In that process, isomerization is conducted by heating and refluxing dichlorobenzene in the presence of aluminum chloride and substantial quantities of water for a substantial period of time, say several hours. One difficulty encountered in conducting a process of this character is the failure to achieve high conversions to the meta isomer. That is, in a single reaction, experiences indicate it is infrequent that the meta-dichlorobenzene concentration in the product substantially exceeds 40 percent. Although this patent reports 47 percent meta isomer concentrations, this degree of conversion has been found to be the exception rather than the rule.

In addition, it has been found advantageous to avoid the presence of water due to equipment corrosion problems raised thereby.

According to this invention, a process has been provided for converting dichlorobenzenes to meta-dichlorobenzene whereby uniformly high conversions in excess of 40 percent are obtained. Also, equipment corrosion problems are minimized.

It has now been discovered that dichlorobenzene isomers other than meta-dichlorobenzene may be isomerized to meta-dichlorobenzene in high conversions by heating the dichlorobenzenes to at least about 120° C. in the presence of aluminum chloride and anhydrous hydrogen chloride and under superatmospheric pressure. Pressures ranging from about 650 or 700 pounds per square inch gauge to about 1350 pounds per square inch gauge, and even higher, e. g. 1500 pounds per square inch gauge, are suitable. Meta-dichlorobenzene concentrations range from 43 percent to in excess of 51 percent in the product provided by a single reaction. Conversions of this magnitude are achieved readily with reaction periods of from 1 to 5 hours.

Substantially anhydrous hydrogen chloride is employed and the system is essentially free from water. It is to be understood that by essentially anhydrous conditions, the absence of substantial quantities of moisture and the intentional omission of water is intended. Of course, incidental traces of water usually encountered in commercial operation under so-called anhydrous conditions are tolerable.

In practice, various expedients may be used to conduct the reaction. A typical procedure involves charging a mixture of dichlorobenzenes, lean in the meta isomer, to an autoclave. Thereafter, the autoclave is closed, and anhydrous hydrogen chloride fed into the liquid contents. Heating is effected by usual techniques and the desired pressure is achieved, either by autogenous generation or by forcing an inert gas into the autoclave.

After effecting the isomerization according to the present invention, the reaction mixture may be treated to recover the dichlorobenzene. First, it is generally desirable to neutralize the mixture with an alkaline compound such as sodium hydroxide. If the neutralization is conducted with an aqueous solution or dispersion of the alkaline material, as is usual, the resulting system is phase separated and the organic layer washed and dried, for example, by passage over or in contact with a calcium chloride or other drying material. The resulting material may then be fractionally distilled to recover a dichlorobenzene product rich in the meta-dichlorobenzene isomer.

Thus, the dichlorobenzene mixture recovered from the isomerization reaction process of this invention, may be subjected to atmospheric distillation in a multi-plate column, and a cut taken at about 171° C. to 172° C. or possibly 174° C. This cut or fraction will contain from 65 to 75 percent by weight of the meta dichlorobenzene isomer. If desired, even higher purity meta-dichlorobenzene may be obtained by fractional distillation employing an especially efficient column such as a 50 to 60 plate column. Also, purified meta-dichlorobenzene may be obtained by fractional crystallization, thermal diffusion or other similar physical expedients.

The quantity of employed aluminum chloride is not particularly critical. For most purposes, about 10 percent aluminum chloride by weight of the charged dichlorobenzene is effective, although it will be appreciated that larger quantities are suitable. Also, smaller concentrations of aluminum chloride appear to be satisfactory, although most efficiently, between 5 and 15 percent aluminum chloride is recommended.

The commercial mixtures of dichlorobenzene are those which are most frequently employed, although essentially pure ortho-dichlorobenzene or para-dichlorobenzene are isomerized with comparable effectiveness. In view of the availability of commercial ortho-dichlorobenzene at lower cost than commercial para-dichlorobenzene, it is naturally preferable to employ the cheaper material. Commercial ortho-dichlorobenzene is not always pure ortho isomer, but typically contains some 73 percent orthodichlorobenzene, 0.3 percent meta-dichlorobenzene and approximately 24 percent para-dichlorobenzene. It should be appreciated, however, that most any mixture of ortho and para-dichlorobenzene which is economically advantageous may be employed in conjunction with the present invention.

It is emphasized that the desired and uniformly high meta-dichlorobenzene conversions are obtained only when superatmospheric pressures are utilized. Attempts to obtain comparable conversions using but atmospheric pressure have not provided comparable conversions. For example, with a pressure of 15 pounds per square inch gauge, the conversions have been drastically lower. Accordingly, in the practice of this invention and the obtention of high conversions, it is necessary to employ superatmospheric pressures ranging upwards of about 650 pounds per square inch gauge. Optimum superatmospheric pressures range from about 850 pounds per square inch gauge to about 1000 pounds per square inch gauge.

In practice, the quantity of anhydrous hydrogen chloride which is employed is that amount which is adequate to generate the desired superatmospheric pressure in a closed system. It will be appreciated that this quantity will vary considerably depending upon the reactor size and the exact reaction temperature employed.

Temperatures on the order of 130° C. have been found most convenient and efficient, but of course, even higher temperatures are effective. For the most part, temperatures from 120° C. to about 200° C., or slightly lower are recommended.

The following examples serve to illustrate the invention.

*Example I*

Into a 300 cubic centimeter autoclave suitably fitted with a rocking agitator were placed 190 grams of commercial ortho-dichlorobenzene, 19 grams of anhydrous aluminum chloride, and anhydrous hydrogen chloride at 200 pounds per square inch gauge pressure at room temperature. This mixture was heated in a closed system to a temperature of 130° C., whereby a pressure of 700 pounds per square inch gauge was generated. The temperature was maintained for a period of 5 hours and the products were thereafter recovered.

Upon analysis, this product was found to contain 32.4 percent ortho-dichlorobenzene, 43.2 percent meta-dichlorobenzene, and 20.4 percent para-dichlorobenzene. The charged commercial ortho-dichlorobenzene contains 73.5 percent ortho, 3.2 percent meta, and 24.1 percent para-dichlorobenzene.

*Example II*

Following the procedure of Example I, with the exception that a superatmospheric pressure of 850 pounds per square inch gauge was employed, resulted in an isomeric reaction mixture containing 28.0 percent ortho, 46.1 percent meta, and 23.5 percent para-dichlorobenzene.

*Example III*

With a superatmospheric pressure of 950 pounds per square inch and otherwise following the procedure of Example I, a reaction product containing 23.5 percent ortho, 51.1 percent meta, and 23.9 percent para-dichlorobenzene was prepared.

*Example IV*

With a superatmospheric reaction pressure of 1350 pounds per square inch gauge, the reaction product contained 33.6 percent ortho, 44.8 percent meta, and 20.4 percent para-dichlorobenzene.

*Example V*

With a superatmospheric pressure of 15 pounds per square inch gauge and following the procedure of Example I, but heating 10 hours, a product containing 74.2 percent ortho, 12.6 percent meta and 13.0 percent para-dichlorobenzene was obtained.

By comparison, it will be seen that even with longer reaction periods, the failure to use sufficiently high pressures results in low conversions.

From the foregoing examples it is clear that by recourse to the conditions herein specified, it is possible to obtain dichlorobenzene mixtures containing an excess of 40 percent meta-dichlorobenzene by weight of the dichlorobenzene in a single step. That is, it is possible to obtain the so-called equilibrium mixture of the three dichlorobenzene isomers without repeated treatments.

The starting dichlorobenzene component should preferably be free from impurities which might have a deleterious effect upon the isomerization. Experience will dictate whether a particular starting dichlorobenzene mixture contains impurities which interfere with effective isomerization. If it is found that these impurities do interfere, it may be first possible to treat the dichlorobenzene with a small amount of a concentrated sulphuric acid, usually by refluxing with the acid or other Friedel-Crafts type catalysts subsequently separating the dichlorobenzene by fractional distillation.

While the invention has been defined hereinbefore with reference to specific details of certain embodiments, it is to be understood that the invention is not intended to be limited thereto except insofar as the appended claims are concerned.

I claim:

1. The method of isomerizing dichlorobenzene isomers other than the meta-dichlorobenzene isomer whereby to obtain meta-dichlorobenzene which comprises heating a dichlorobenzene isomer other than meta-dichlorobenzene to a temperature of at least 120° C. in the presence of aluminum chloride and anhydrous hydrogen chloride and at a superatmospheric pressure of at least 650 pounds per square inch gauge.

2. The method of isomerizing a mixture containing ortho-dichlorobenzene and para-dichlorobenzene whereby to obtain meta-dichlorobenzene which comprises heating said dichlorobenzene mixture to a temperature of at least 130° C. in the presence of aluminum chloride and anhydrous hydrogen chloride and at a superatmospheric pressure from 700 to 1350 pounds per square inch.

3. The method of producing meta-dichlorobenzene from other dichlorobenzene isomer which comprises heating a dichlorobenzene isomer other than meta-dichlorobenzene to a temperature of at least 130° C. under a superatmospheric pressure of from 700 to 1350 pounds per square inch in the presence of aluminum chloride and anhydrous hydrogen chloride.

4. The method of preparing meta-dichlorobenzene which comprises heating an isomeric mixture of dichlorobenzene containing predominantly ortho-dichlorobenzene to a temperature of at least 130° C. at superatmospheric pressure from 850 to 1000 pounds per square inch in the presence of aluminum chloride and anhydrous hydrogen chloride.

5. Any invention here described.

References Cited in the file of this patent

UNITED STATES PATENTS 2,727,075    Mattano _____ Dec. 13, 1955

UNITED STATES PATENT OFFICE

CERTIFICATE OF CORRECTION

Patent No. 2,819,321                                                  January 7, 1958

Blaine O. Pray

It is hereby certified that error appears in the printed specification of the above numbered patent requiring correction and that the said Letters Patent should read as corrected below.

Column 4, line 54, strike out the following claim —

5. Any invention here described.

Signed and sealed this 14th day of April 1959.

(SEAL)
Attest:

KARL H. AXLINE
Attesting Officer

ROBERT C. WATSON
Commissioner of Patents